(12) United States Patent
Andelman et al.

(10) Patent No.: US 7,368,191 B2
(45) Date of Patent: May 6, 2008

(54) ELECTRODE ARRAY FOR USE IN ELECTROCHEMICAL CELLS

(75) Inventors: Marc D. Andelman, Worcester, MA (US); Jon Zulkiewicz, Palmer, MA (US)

(73) Assignee: Biosource, Inc., Worcester, MA (US)

( * ) Notice: Subject to any disclaimer, the term of this patent is extended or adjusted under 35 U.S.C. 154(b) by 593 days.

(21) Appl. No.: 10/484,981

(22) PCT Filed: Jul. 23, 2002

(86) PCT No.: PCT/US02/23397

§ 371 (c)(1),
(2), (4) Date: Jan. 23, 2004

(87) PCT Pub. No.: WO03/009920

PCT Pub. Date: Feb. 6, 2003

(65) Prior Publication Data

US 2005/0079409 A1    Apr. 14, 2005

Related U.S. Application Data

(60) Provisional application No. 60/307,789, filed on Jul. 25, 2001.

(51) Int. Cl.
*H01M 8/00* (2006.01)
*H01M 8/04* (2006.01)
*H01M 10/44* (2006.01)
*H01M 2/00* (2006.01)
*H01M 4/00* (2006.01)

(52) U.S. Cl. .............................. 429/12; 429/13; 429/40; 429/22; 429/50; 429/61

(58) Field of Classification Search .................. 429/12, 429/13, 40, 22, 50, 61
See application file for complete search history.

(56) References Cited

U.S. PATENT DOCUMENTS

| 3,244,612 | A | 4/1966 | Murphy |
| 3,515,664 | A | 6/1970 | Johnson et al. |
| 3,869,376 | A | 3/1975 | Tejeda ......................... 204/301 |
| 4,165,273 | A | 8/1979 | Azarov et al. .............. 204/301 |
| 4,608,140 | A | 8/1986 | Goldstein ................ 204/182.3 |
| 4,632,745 | A | 12/1986 | Giuffrida et al. ........... 204/301 |

(Continued)

FOREIGN PATENT DOCUMENTS

EP    0 436 436 B1    8/1994

(Continued)

*Primary Examiner*—Brian Sines
(74) *Attorney, Agent, or Firm*—Leslie Meyer-Leon; IP Legal Strategies Group P.C.

(57) ABSTRACT

The invention features an electrode array (7) in which pairs of electrodes (1) are geometrically arranged so that the broadest faces of the exposed electrodes are not directly opposing to each other. Rather, the broadest facing surfaces of the electrodes in the array are parallel, adjacent, or offset at an angle. The electrode geometry of an electrode array of the invention permits electrodes to be in close proximity, thereby lowering series resistance, while minimizing the possibility for short circuits that can cause electrical leakage. An electrode array of the invention can be used in an electrochemical cell, such as a battery, e.g., a lithium battery, a capacitor, a flow-through capacitor, or a fuel cell.

19 Claims, 7 Drawing Sheets

U.S. PATENT DOCUMENTS

| | | | | |
|---|---|---|---|---|
| 4,747,929 | A | 5/1988 | Siu et al. | 204/301 |
| 4,956,071 | A | 9/1990 | Giuffrida et al. | 204/301 |
| 4,977,440 | A | 12/1990 | Stevens | |
| 5,070,036 | A | 12/1991 | Stevens | |
| 5,192,432 | A | 3/1993 | Andelman | 210/198.2 |
| 5,196,115 | A | 3/1993 | Andelman | 210/198.2 |
| 5,200,068 | A | 4/1993 | Andelman | 210/198.2 |
| 5,308,466 | A | 5/1994 | Ganzi et al. | 204/151 |
| 5,360,540 | A | 11/1994 | Andelman | 210/198.2 |
| 5,415,768 | A | 5/1995 | Andelman | 210/198.2 |
| 5,503,729 | A | 4/1996 | Elyanow et al. | 204/630 |
| 5,538,611 | A | 7/1996 | Otowa | 204/550 |
| 5,547,581 | A | 8/1996 | Andelman | 210/656 |
| 5,548,474 | A * | 8/1996 | Chen et al. | 361/313 |
| 5,558,753 | A | 9/1996 | Gallagher et al. | 204/632 |
| 5,620,597 | A | 4/1997 | Andelman | 210/198.2 |
| 5,706,165 | A | 1/1998 | Saito et al. | 361/502 |
| 5,748,437 | A | 5/1998 | Andelman | 361/302 |
| 5,776,384 | A | 7/1998 | Firsich et al. | 264/29.4 |
| 5,779,891 | A | 7/1998 | Andelman | 210/198.2 |
| 5,858,191 | A | 1/1999 | DiMascio et al. | 204/524 |
| 5,868,915 | A | 2/1999 | Ganzi et al. | 204/524 |
| 6,094,788 | A | 8/2000 | Farahmandi et al. | 25/25.41 |
| 6,110,354 | A | 8/2000 | Saban | |
| 6,127,474 | A | 10/2000 | Andelman | 524/495 |
| 6,183,914 | B1 | 2/2001 | Yao et al. | |
| 6,214,204 | B1 | 4/2001 | Gadkaree et al. | 205/758 |
| 6,291,266 | B1 | 9/2001 | Sayyah | |
| 6,316,084 | B1 | 11/2001 | Claus et al. | |
| 6,325,907 | B1 | 12/2001 | Andelman | |
| 6,413,409 | B1 | 7/2002 | Otowa et al. | |
| 6,628,505 | B1 | 9/2003 | Andelman | |
| 6,709,560 | B2 | 3/2004 | Andelman et al. | |
| 6,778,378 | B1 | 8/2004 | Andelman | |
| 6,781,817 | B2 | 8/2004 | Andelman | |
| 2002/0037383 | A1 | 3/2002 | Spillman et al. | |

FOREIGN PATENT DOCUMENTS

| | | |
|---|---|---|
| JP | 04-14309 A2 | 5/1990 |
| JP | 09-320906 A2 | 12/1997 |
| JP | 10-50565 A2 | 2/1998 |
| JP | 11-102845 A2 | 4/1999 |
| JP | 11-162795 A2 | 6/1999 |
| JP | 11-232383 A2 | 8/1999 |
| JP | 11-251197 A2 | 9/1999 |
| JP | 2000-169128 A2 | 6/2000 |
| JP | 2000-315627 A2 | 11/2000 |
| JP | 2001-110689 A2 | 4/2001 |
| JP | 2001 300535 A | 10/2001 |
| WO | WO 98/15962 | 4/1998 |
| WO | WO 01/45121 A1 | 6/2001 |
| WO | WO 01/89656 A1 | 11/2001 |
| WO | WO 01/89671 A1 | 11/2001 |
| WO | WO 01/90443 A1 | 11/2001 |
| WO | WO 01/95410 A1 | 12/2001 |

* cited by examiner

ELECTRODE ARRAY FOR USE IN ELECTROCHEMICAL CELLS

REFERENCE TO PRIOR APPLICATION

This application is based on and claims priority from U.S. Provisional Patent Application Ser. No. 60/307,789, filed Jul. 25, 2001, hereby incorporated by reference in its entirety.

GOVERNMENT CONTRACT

This invention was funded under contract with the Army Research Office, under Contract No. DDAD 19-00-C-0448. The United States Government may have certain rights in the invention.

FIELD OF THE INVENTION

The field of the invention is electrodes for electrochemical cells.

BACKGROUND OF THE INVENTION

In electrochemical cells, such as capacitors, batteries, fuel cells, and flow-through capacitors, it is desirable to reduce series resistance and electrical leakage, which waste energy. Normally, to reduce series resistance, it would be desirable place the electrodes close together. However, proximity is difficult to achieve with purely opposing electrodes. In order to place the electrodes close together, for example, closer than 0.03 inches (~760 µm), the dielectric between them must be thin, but this geometry has the undesirable effect of increasing the electrical leakage. Moreover, where the electrochemical cell is a flow-through capacitor, thin dielectric spacers lead to a drop in pressure. Therefore, it is desirable to provide for a new and improved electrochemical cell with minimal series resistance and with low electrical leakage.

SUMMARY OF THE INVENTION

The invention features an electrode array in which pairs of electrodes are geometrically arranged so that the broadest exposed faces of the electrodes are not directly opposed to each other. Rather, the broadest faces of the electrodes in the array are parallel, adjacent, or offset at an angle. The electrode geometry of an electrode array of the invention permits electrodes to be in close proximity, thereby lowering series resistance, while minimizing the possibility for short circuits that, can cause electrical leakage.

The electrode array of the present invention may function as an anode, cathode, or as a stand-alone capacitor or electrochemical cell combining cathodes and anodes in one sheet of material.

Electrodes may be formed as patterns of lines, dots, or other shapes placed on, attached, or formed onto a substrate, including a conductive material, or, alternatively, a nonconductive sheet material. These lines, dots, etc., may be formed in very thin layers and may be spaced very close. An electrochemical cell, fuel cell, battery, capacitor, or flow-through capacitor is formed by the adjacent pairs or groups of lines and dots.

Thus, one aspect the invention features an array of electrodes, whereby the broadest exposed electrode faces of the electrodes are adjacent to each other. Alternatively, the broadest faces of the exposed electrodes are coplanar or offset at an angle, but not directly opposite to each other, whether on the same sheet of a material containing both anodes and cathodes, or between separated anode sheets and cathode sheets. This minimizes the possibility for short circuits that cause leakage. The electric field comes up out of the anodes and curves back to the cathode. The electrodes of the array can be dots, shapes, or lines that can be recessed into the dielectric spacer as a further means of protecting against electrical leakage between them.

The electrode array of the present invention uses a geometric arrangement of parallel, adjacent, or offset electrodes in order to create capacitors, electrochemical cells, or flow-through capacitors. A dielectric insulator serves as a spacer between adjacent electrodes; the spacer may be a porous, nonporous, ion-permeable, ion-selective, membrane, or other dielectric material. Optionally, current collectors are in electrical contact with the electrodes, either placed under, or embedded in, or sandwiched between, the electrodes.

The adjacent geometry of the electrodes within the electrode array reduces series resistance and leakage sufficiently that the distance between the anode and the cathode can be less than 0.03 inches, or can preferably be reduced to 0.005 inches, or to less than 0.001 inches. Electrode materials in any shapes separated by insulating materials may be manufactured with a narrow distance between adjacent electrodes, reduced to 1 micron or less, by using manufacturing methods commonly used to print circuit boards in the semiconductor industry. Where it is preferred to use a wider space between the electrodes, for example, over 0.001 cm, manufacturing methods such as screen or other printing or coating methods will suffice to manufacture the electrode array of the present invention.

The electrode array of the invention can be used in any type of electrochemical cell, such as capacitors, batteries, and fuel cells. An electrode array of the invention can be a used in a flow-through capacitor. Alternatively, an electrode array of the invention can be used in a lithium battery.

In one embodiment, the electrode array is comprised of dots, shapes, or lines that may be recessed into the spacer as a further means of protecting against electrical leakage between them. The broadest faces of the electrodes are offset from each other.

An additional advantage of the present invention is that the electrode arrays may be lines, dots, or any other shapes that can be arranged in patterns with small distances between shapes of each pair of electrodes, for example, less than 3 millimeters, thereby allowing construction of an electrode array containing anode-cathode pairs within a single sheet of material. Therefore, the electrode array sheet may comprise anode-cathode pairs to act as an integrated capacitor, electrochemical cell, or flow-through capacitor. These electrode array sheets, containing one or more anode-cathode pairs per sheet, may be stacked together in any geometry known to prior art flow-through capacitors, electrochemical cells, water filters, batteries, or electronic capacitors.

In one embodiment, the electrode pattern of the present invention forms a two-dimensional electrode array. The electrode array may be used as a double-layer capacitor, capacitor, flow-through capacitor, fuel cell, or any other electrochemical device. The thin electrodes, for example, less than 0.13 cm thick, and thin spacing, for example, less than 0.13 cm apart, of this array reduce leakage and ESR. Leakage is reduced because the broadest face of each electrode of an electrode pair is offset from the other electrode. Because the electrodes may be placed close together without generating electrical leakage, series resistance is reduced. Series resistance of less than 50 ohms/cm$^2$ of electrode array facial area and leakage resistance of more than 30 ohms/cm$^2$ of electrode array facial area can be achieved by the present invention.

DETAILED DESCRIPTION

The electrode array of the present invention may be used in double-layer capacitors; flow-through capacitors or electrochemical cells; solid polymer electrolyte or nonelectrolyte-containing capacitors; nonelectrolytic, nonelectrolyte-containing, solid electrolyte-containing, or in nondouble layer batteries or capacitors, by use of any conductive metal or material for the electrode, and use of any dielectric material for the spacer, including ceramic, polymer, MYLAR® (MYLAR is a registered trademark of E.I. Du Pont De Nemours and Company Corporation of Wilmington, Del.) sheet material, or any other materials commonly used to make film-type capacitors. Arrays of electrodes of the present invention may also be used for lithium storage or other intercalation battery devices, either combined with an electrolyte or with a solid polymer electrolyte material.

A preferred embodiment of the present invention is the use of the array for electrolyte-containing electrochemical cells and flow-through capacitors. Any carbon or carbon binder mixture known in the art in doublelayer capacitors may be used. Gel and hydrogel binders are also efficacious, including use of ion-permselective (i.e., selective permeability) or cross-linked, ion exchange, polyelectrolyte gels.

Where both anodes and cathodes are included in the same sheet array material, the sheet itself may form an entire electrochemical cell or flow-through capacitor. These sheets may be stacked together in any geometry known to flow-through capacitors, batteries, or water filters, including spiral wound, pleated, stacked polygon, or disc. Where anode-cathode pairs are contained within the same sheet of material, each sheet itself functions as an electrochemical cell. In this way, anode and cathode pairs do not need to be formed between two opposing layers or sheets. The spacing between adjacent anode-cathode electrode pairs within the same sheet may be small, and no longer simultaneously depends upon the thickness of the flow spacer, as in prior art flow-through capacitors, electrochemical cells, and flow-through electrochemical cells. The spacer does not need to do double duty as both an insulator, which requires thinness for low series resistance, and a flow channel, which has the opposite requirements of open area. Therefore, when used in flow cells, such as flow-through capacitors and fuel cells, the spacing between opposing electrode array sheets may be much thicker than the spacing between sheet electrodes of prior art electrochemical cells. Because the sheet electrodes of the present invention can constitute complete electric cells, unlike prior art electrochemical cells, the separation distance between sheet electrodes may be increased without substantially increasing series resistance. For example, the surfaces of the sheet electrode or electrode array may be separated by flow spacers or spacers of greater than 0.002 cm thick, for example, up to 1.0 cm thick or more. No flow spacer at all may be used, in which case the electrolyte, working fluid, or purification or concentration feed stream may be simply flowed past or over the electrode array. Where flow spacers are used, the cells may be made using any cartridge geometry, cartridge holders common to prior art flow-through capacitors, or electrochemical cells, with the option that spacers between layers may be replaced by holding the layers apart under tension, with shims or supports placed more than 1.0 mm apart, or alternatively, the thicker spacers above may be used to achieve low pressure drops of less than 2 kilograms per square centimeter and not significantly increase series resistance.

U.S. Pat. No. 6,110,354, issued Aug. 29, 2000, teaches electrode arrays used for electrochemical sensors, whereby the nonfaradaic, capacitance component is minimized. An additional purpose of the present invention is to maximize the nonfaradaic, capacitance component used in energy generation, energy storage, or other electrochemical cells. This is done by the selection of relatively high surface area electrode materials. For use in capacitors and many other electrochemical cells, a preferred embodiment of the present invention is use of electrode material with a surface area of over 10 square meters per grain B.E.T. For use in capacitors, certain batteries, and other electrochemical cells, electrode materials with a surface area of over 300 m2 per gram are preferred. Otherwise, U.S. Pat. No. 6,110,354 and the references cited therein teach methods of manufacture and electrode array geometries that may be directly adapted to the present invention by the incorporation of said relatively high surface area electrode materials. The present invention may make use of electrodes with the less than 100 micron spacing described in U.S. Pat. No. 6,110,354, or, may alternatively make use of wider electrodes with over 10 to 1000 times greater surface area and spacing than described in U.S. Pat. No. 6,110,354. All the means of fabricating and interconnecting electrodes, as well as the general geometry and method of making flow channels with or of the electrodes described in U.S. Pat. No. 6,110,354 may be used in the present invention. Use of inert electrode materials, such as graphite, gold, platinum series metals, and any form of carbon, is particularly preferred. However, for use in many batteries, electrochemically reactive metals, and other conductive compounds which form reversible surface area compounds or complexes may be preferentially used.

Another preferred form of the present invention is the selection of electrode array dimensions, whereby the distance between anode and cathode electrodes is less than the diffusion length of the electrolyte solute for a given charge cycle time.

The electrode array of the present invention may also be used for analytical electrochemistry of any material present in the electrolyte, including organic, inorganic, or biological compounds.

FIG. 1A shows a frontal view of the broadest faces of electrodes 1 in an electrode array 7 formed from two electrodes 1 that are in the shape of lines and are arranged in parallel. The electrodes 1 are separated by spacer 2, and optionally separated by a current collector 6. Optional parallel lead means 5 connect alternating electrodes 1 into alternating arrays of anodes and cathodes. Lead means 5 may also be used to connect every two or more alternate electrodes 1. Alternatively, lead means 5 may be used to connect only the end electrodes 1, in order to form electrodes in series.

FIG. 1B is a cross-sectional view showing the thin edge of one electrode 1 line and its underlying optional current collector 6. The broadest face of electrode 1 is perpendicular to the page. This current collector 6 may typically be metal or graphite, and the electrode 1 may typically be a high capacitance carbon held together with a binder, for use in doublelayer capacitors, flow-through capacitors, or electrochemical cells, or, may be aluminum or other metal for use ira solid polymer electrolyte or nonelectrolyte-containing capacitors.

Figure 1:
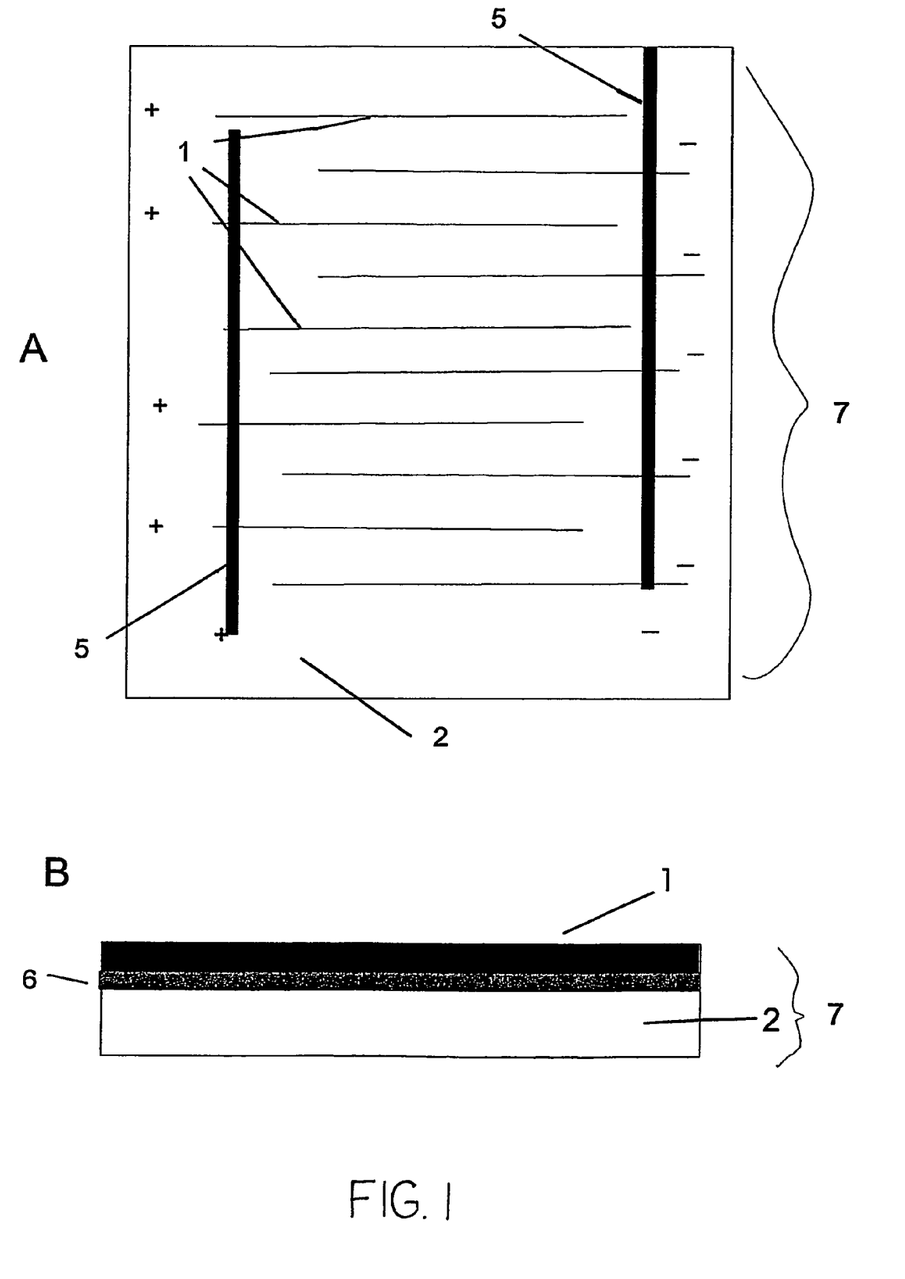
FIG. 1A is a frontal illustration of an embodiment of an electrode array that includes two parallel electrodes and a spacer, optionally separated by a current collector.
FIG. 1B is a cross-sectional view of the electrode array shown in FIG. 1A.

The electrode array 7 of FIG. 1 is formed by any manufacturing method able to form patterns of adjacent lines or shapes, such as by coating, printing, extruding, coextruding, spraying, or electroplating the electrodes 1 onto a spacer 2. Coating methods may include, but are not limited to: dip, brush, knife, roll, airbrush, spray, extruded, print, cast, and strip coating.

Figure 2:
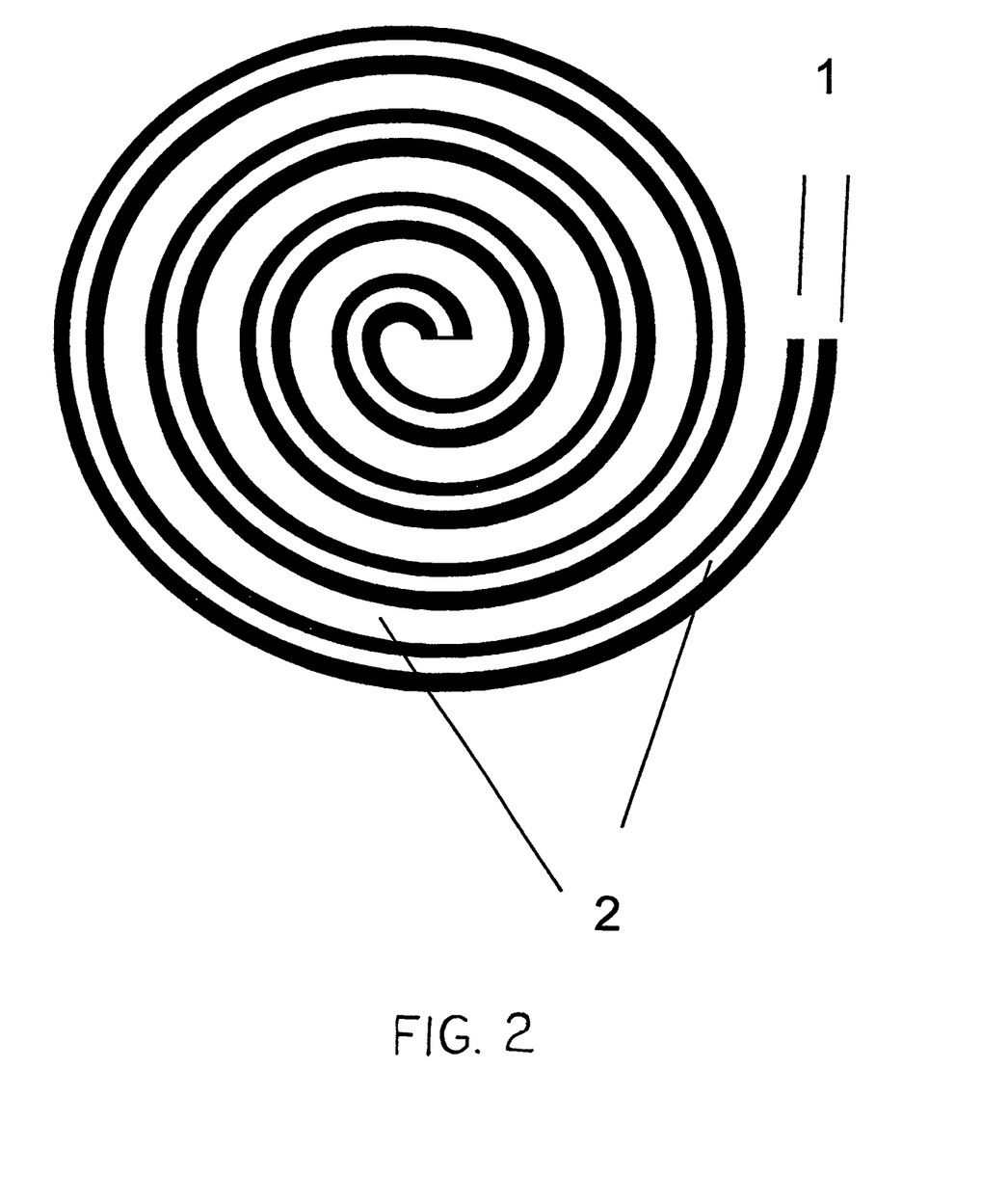
FIG. 2 is an illustration of an electrode array in which adjacent concentric electrodes are separated by a dielectric spacer.

FIG. 2 shows an electrode array 7 formed by adjacent concentric spiral or circle electrodes 1 sandwiching spacer or spacers 2. The broadest face of each electrode is directed outward from the page. This combination, with optional current collectors 6 that may underlie or overlay the electrode layers, forms the electrode array 7 of the present invention. Current collectors 6 may be placed within or bisect electrode layers, or form a sandwich with an electrode layer either to the sides of the current collector 6, perpendicular to the sheet surface, or above and below the current collector 6, parallel to the sheet surface.

Figure 3:
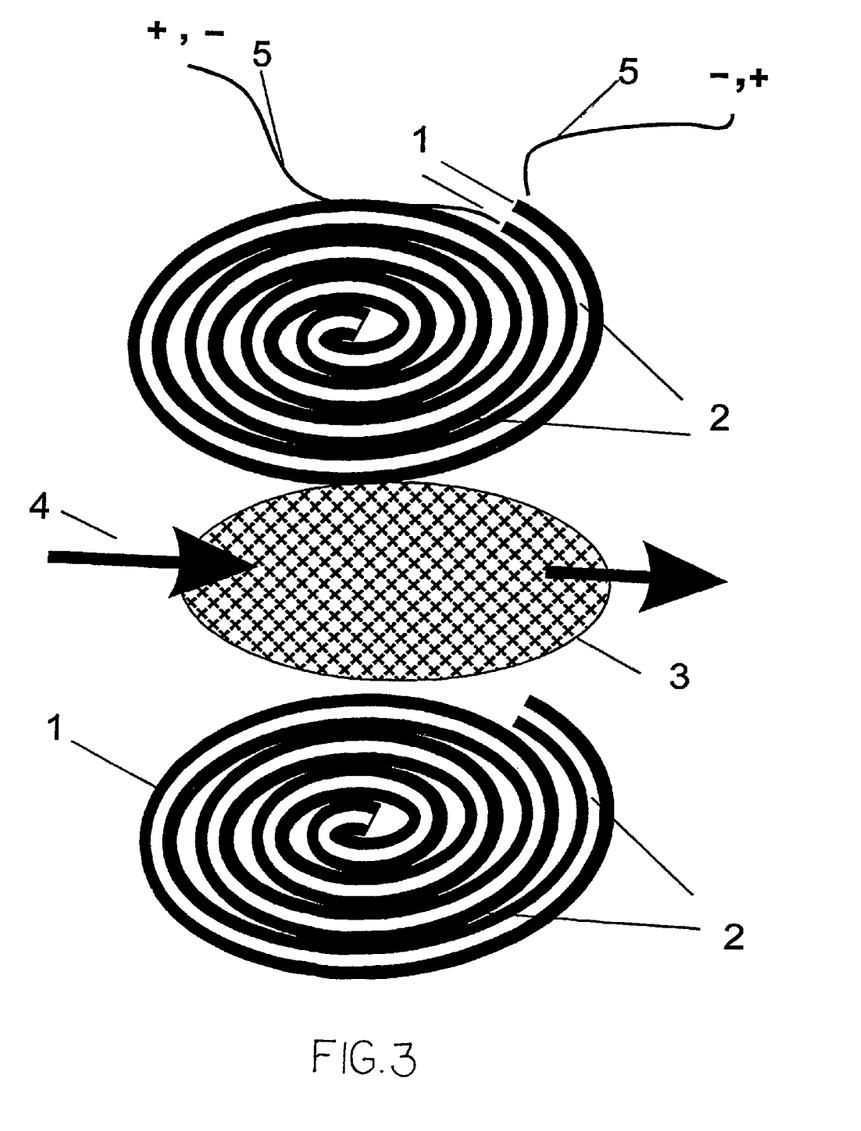
FIG. 3 shows two of the concentric electrode arrays illustrated in FIG. 2, separated by a flow spacer, which forms a flow path.

In FIG. 3, two of the concentric electrode arrays 7 depicted in FIG. 2 are arranged for use in a flow-through capacitor or flow-electrochemical cell. The electrode arrays 7 are separated by a flow spacer 3, which forms a flow path 4 for the flow of fluid across the electrodes 1. Leads 5 can connect to a source of power. Alternatively, leads 5 form a series connection with another capacitor.

Figure 4:
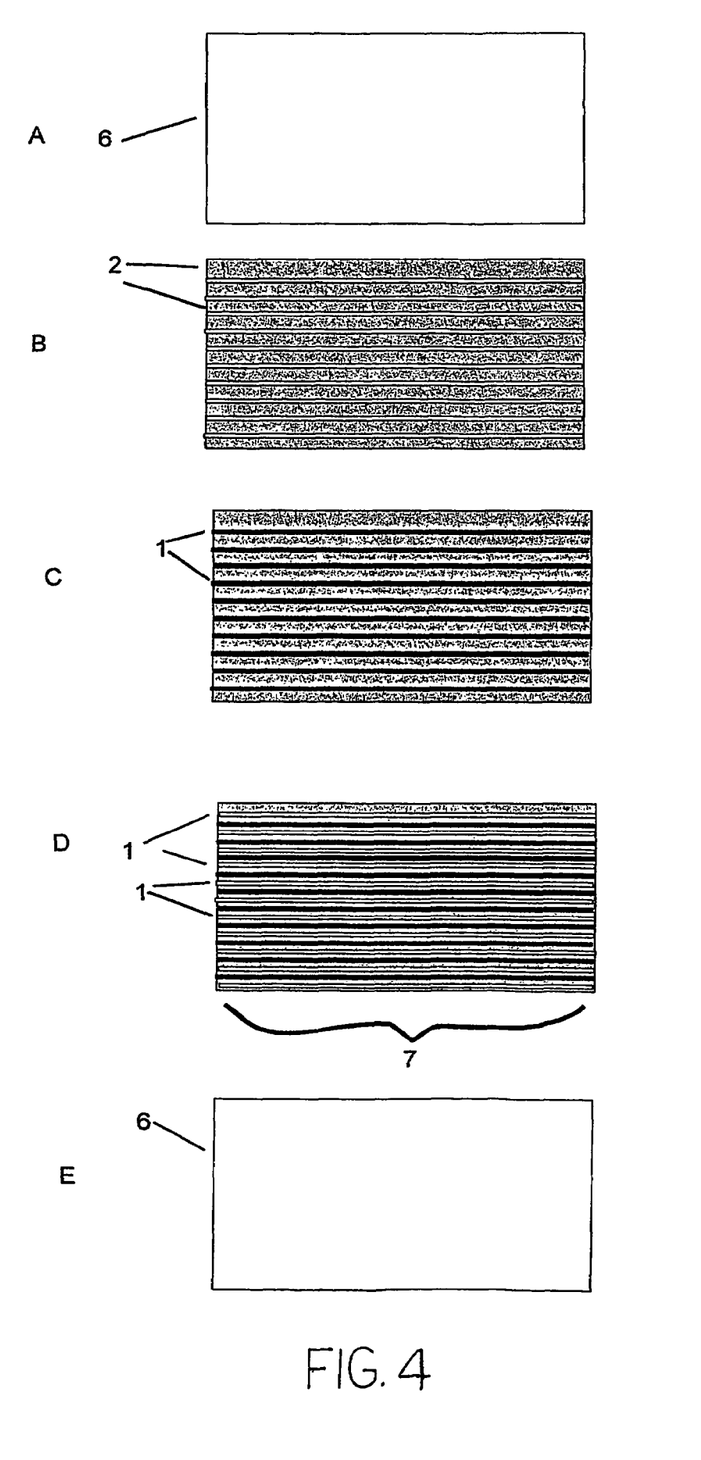
FIG. 4 shows a layered geometry for designing and manufacturing an electrode array according to the present invention, where (A) is a base supporting layer; (B) is a an insulating layer formed by forming a pattern of dielectric spacer on the base substrate shown in (A); (C) shows a linear array of electrode material placed on top of the portions of the substrate that remain exposed in layer (B); (D) shows an optional additional set of electrodes which are electrically insulated from the electrodes deposited in (C); and (E) is a second current collector optionally placed against the electrode array shown in (D).

FIGS. 4A-4E show a stepwise process of arranging a layered geometry for an electrode array according to the present invention. In FIG. 4A, a planar sheet is provided to serve as a base or supporting layer on which to form the electrode array 7. In the embodiment shown, the supporting layer is prepared from a planar sheet current collector 6, such as a sheet of graphite or metal, either alone as a thin sheet, for example, under 0.15 cm thick, a foil sheet, e.g., a foil sheet of less than 0.03 cm thick, or a conductive material coated on top of a support material, such as plastic, or MYLAR®, or the like.

In FIG. 4B, an insulating layer is deposited to form a dielectric spacer 2. Dielectric spacer 2 can be formed onto the supporting substrate by processes known to those skilled in the art. Without limitation, the dielectric spacer 2 can be laced, coated, printed, embossed, engraved, machined, or attached on top of the base layer. This insulating layer can have a geometry of lines, as shown in here, or may be of alternative shapes, such as dots, squares, stars, polygons, or circles.

In an alternative embodiment, the order of addition of materials used to form these two layers can be reversed. In this configuration (not shown), the substrate layer is formed from a sheet of a dielectric material, on which is deposited a current collector material as the layer analogous to that shown in FIG. 4B, as lines or other adjacent shapes on top of the supporting substrate.

FIG. 4C shows linear electrode material that has been placed on top of the exposed current collector lines of FIG. 4B. One method to do this would be to apply or wipe on a capacitance-containing or other electrode material, typically a carbon material mixed with a binder. This capacitance material could, for example, fill grooves formed by exposed current collector and flanking spacer layers. Excess can be washed or wiped off. In addition to printing methods of manufacture, various methods may be employed to apply this and other layers. For example, any layer may be etched, deposited from a gas phase, roll coated, spin coated, dip coated, doctor bladed, coated, sprayed, stamped, or electrocoated, electron beam manufactured, laser and micro photographically plotted, etched, or masked, electrochemically plated or reacted, or otherwise attached or placed upon the exposed current collector 6.

FIG. 4D shows an optional additional set of electrodes 1 which are electrically insulated from the first set of electrodes 1, so that they may be charged oppositely to these to form either anodes or cathodes. Electrodes 1 may be either anodes or cathodes. In order that the electrodes 1 may comprise groupings of two or more that may form anode-cathode groups or pairs when placed opposite to each other, the pairs or groups of electrodes 1 must be made on top of insulating layer 2. The anodes and cathodes do not have to be equal in number or size. They may optionally be equal in additive surface area if it is desirable as a means to improve function or balance the voltage. It may also be desirable to connect all electrodes on a given current collector 6 together, or to isolate or electrically insulate every other electrode 1, or some lesser percentage, for example, $\frac{1}{100}$ of $\frac{1}{10}$, spaced evenly throughout the electrode array 7. In this way, half or more of the electrodes 1 may be connected together to form an anode or cathode, and half or less of the remaining electrodes may be connected together to form the oppositely-charged cathode or anode. To form a capacitor, more or less equal numbers of like electrodes 1, or different numbers of electrodes 1 representing equal amounts of capacitive material, should be used.

FIG. 4E is a second current collector 6 that may optionally be sandwiched against the electrode array 7 shown in FIG. 4D in order to provide current to subsets of electrodes 1. Preferably, however, a current collector 6 may be printed as lines on top of electrodes 1. These could be cross-connected by a perpendicular lead 5, as shown in FIG. 1.

Generally, the insulating layer is manufactured such that a pattern of current collector lines, dots, squares, stars, polygons, circles, any other shapes shows through, is made on top of, or, is produced parallel and adjacent to, the insulating layer(s) 2, creating current collector layer(s) 6 with exposed faces. Photo masking, photo lithography, pad printing, screen or other forms of printing are one good ways to make the structures shown in layers 4B, 4C, and 4D.

Figure 5:
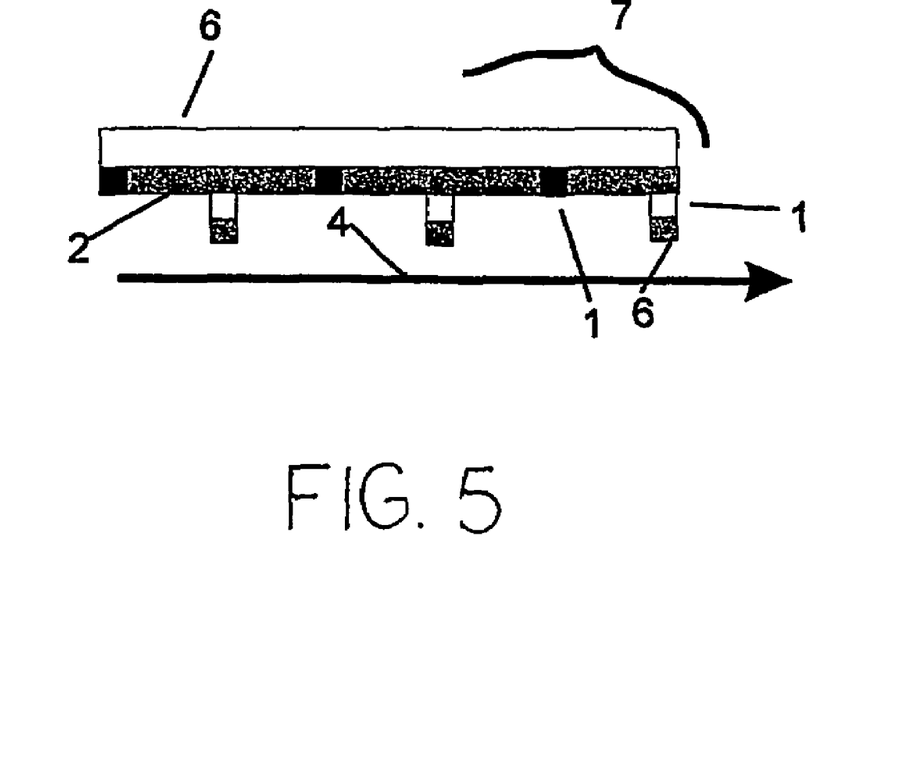
FIG. 5 shows an electrode array in which the electrodes may optionally either protrude from or be embedded in a substrate. The substrate may optionally be an insulating layer or current collector. The electrodes are coplanar and may have either underlying or overlying current collectors.

FIG. 5 is a cross-sectional schematic view of the electrode array 7 shown in FIG. 4D. This shows that the optional current collector 6 may either be a continuous layer connecting electrodes 1 together, as shown in the top part of FIG. 1B, or may be arrayed along with the electrodes 1 themselves in a discontinuous fashion, restricted on, within, or more or less congruent with the electrodes 1, as shown in the bottom of FIG. 5.

Figure 6:
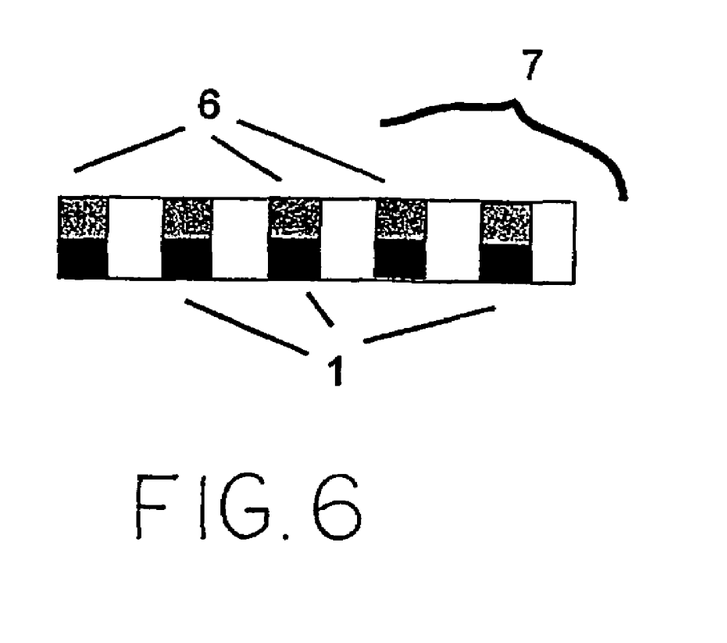
FIG. 6 shows an electrode array in which the electrodes are coplanar and adjacent to each other within the same sheet of material.

One preferred embodiment of the invention is shown in FIG. 6. Electrodes 1 are both coplanar and adjacent within the same sheet of material. Current collectors 6 may underlie, be embedded in, or bisect a doubled electrode layer, one on each side of the current collector 6. Insulating, dielectric, ionically-conducting or nonionic-conducting spacers 2 prevent electron leakage between electrodes 1, allowing anode and cathode pairs to form. The anodes and cathodes may be connected in series or in parallel, for example, as shown in FIG. 1.

Figure 7:
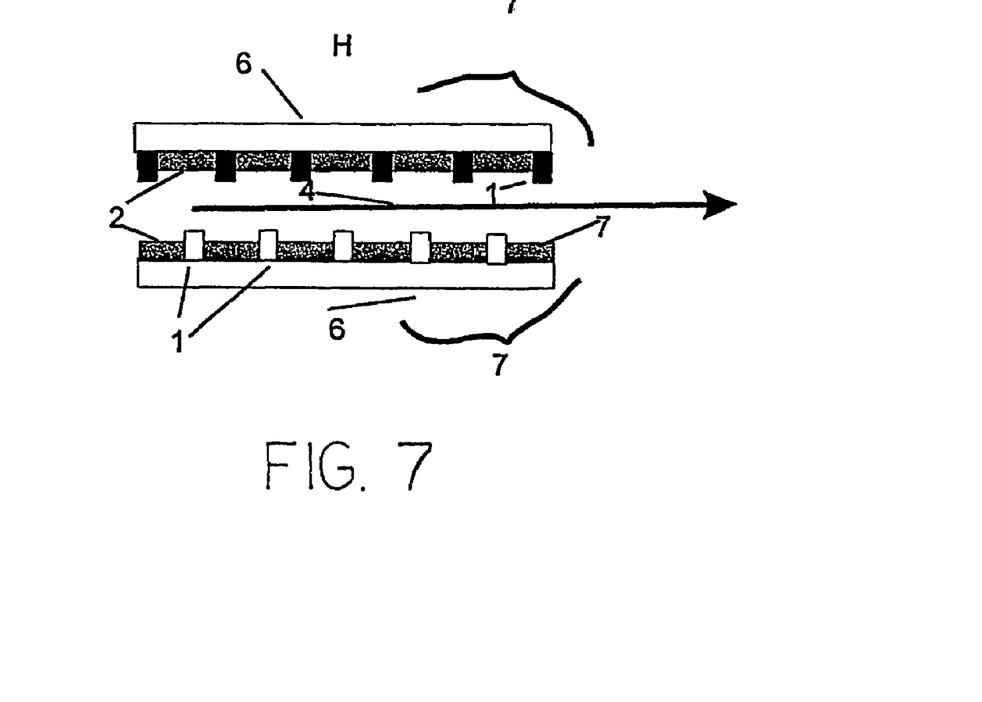
FIG. 7 illustrates two electrode arrays placed together.

FIG. 7 illustrates how two electrode arrays 7 can be placed together in order to bracket a flow channel. A channel for fluid flow may be formed via flow spacer 4 by use of an electrically-insulating, added spacer material or layer, or a pair of layers, including membranes, nonwoven, and woven materials (not shown) through which a fluid can flow, which flow spacer 4 may be ionically conductive or not. Any layer may optionally be raised, protruded, or recessed above or below the other layers of the array surface, as shown, for the particular case of electrodes 1. Raised layers may be placed together on opposing electrode array sheets to form a flow path 4.

Figure 8:
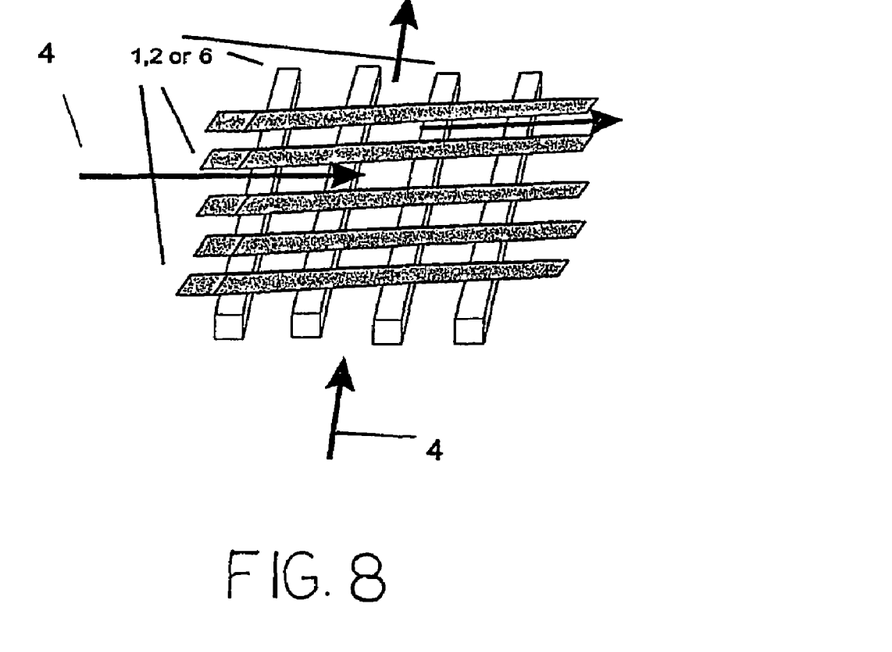
FIG. 8 illustrates a flow channel formed by the misalignment of grooves between two electrode arrays.

As shown in FIG. 8, flow path 4 may be formed by either aligning or misaligning of grooves, ridges, or bumps represented by any combination, either together or different, of the current collector 6, electrodes 1, or dielectric spacer 2, when put together to form flow paths 4 from two electrode arrays 7. As an example, two planar electrode arrays 7 are prepared. In the first array, either or both of electrodes 1 and dielectric spacers 2 can be formed on a substrate layer as a raised lines, bumps, or the like. The second electrode array 7 is formed in a likewise manner, by forming electrodes 1, dielectric spacers 2, and optionally, current collectors 6 as raised lines or other. When these two arrays are put together, the lines or shapes are offset in order to form biplanar other flow channels, as shown in FIG. 8. Alternatively, any of the materials of the present invention may contain grooves or form grooves in combination with any other layer material, in order to form flow channels when put together with another similar electrode array, or with simply another sheet material, for example, a plastic film.

Another method to create a flow channel is to use a separate flow spacer 3 between electrode array sheets. Any membrane or spacer known to be used in reverse osmosis, flow-through capacitors, batteries, fuel cells, or capacitors can be used as an electrically-insulating layer and/or as a flow spacer 3 between electrode arrays.

Geometries which allow for anode-cathode pairs of electrodes 1 or electrode material where the majority of the facial surface does not directly oppose the opposite polarity electrode 1 will form the electrode array of the present invention. One way to achieve this is for the electrodes to be coplanar. Anodes and cathodes may be coplanar in the same sheet of material. Alternatively, electrodes 1 which comprise, at any one time, anodes or cathodes, which may be contained in different sheets, separated by a spacer, while at the same time having less than 50% of their facial areas directly opposing each other, according to the present invention. For example, electrodes 1 made as arrays of lines or other shapes may be made into separate anode and cathode sheets, which may be placed on top of each other and separated by a spacer layer. The only portion of these lines that would oppose each other would be when the lines or shapes intersect. More than 50% of the facial area of the electrodes would not be directly opposed to each other. In the case where anodes and cathodes are formed on the same sheet of material, the amount of overlap between separated sheets of materials does not matter. When electrode array sheets containing both anodes and cathodes within the same sheet are layered, these array sheets may be electrically isolated by means of an extra thick spacer, for example, over 0.001 inches thick, without increasing electrical resistance. The thick insulating spacer in this case also serves as a means to contain electrolyte. However, unlike in the prior art, making this spacer thick in order to insulate one layer from the next does not increase resistance. The resistance is governed by the space between the lines or shapes that form the electrode array. Electrodes 1 formed as lines, strips, or rectangles upon a flat nonconductive surface, with the widest capacitive surface of the electrode 1 in the same plane as the nonconductive spacer surface 2, will form a capacitor, battery, electrochemical cell, or anode-cathode pair or grouping or electrode array 7, according to the present invention. In this case, the electrodes 1 are also coplanar with the current collector 6 and dielectric spacer 2. The widest capacitive surface or surfaces off the electrodes 1 may also be offset from the plane of the spacer or spaced apart layers. For example, the capacitance or electrochemical electrodes 1 may be formed as indentations, grooves, or sides of holes cut into an electrode material.

Any of the layers represented in FIGS. 1-8, including dielectric spacers 2, flow spacers 3, insulators, electrodes 1, or current collectors 6 can be manufactured by any of the following methods: extrusion, photo masking, photolithography, lithography, screen printing, intaglio printing, stenciling, drawing, spraying, electroplating, electrostatically sticking, electrocoating, embossing, photo engraving, ink-jet printing, laser printing, off-set printing, contact printing, thermography, digital printing, gravure printing, as well as any optical, digital, photographic, light sensitive, or any other masking technique known to be used in the coatings, printing, circuit board, optical, or semiconductor industry.

Figure 9:
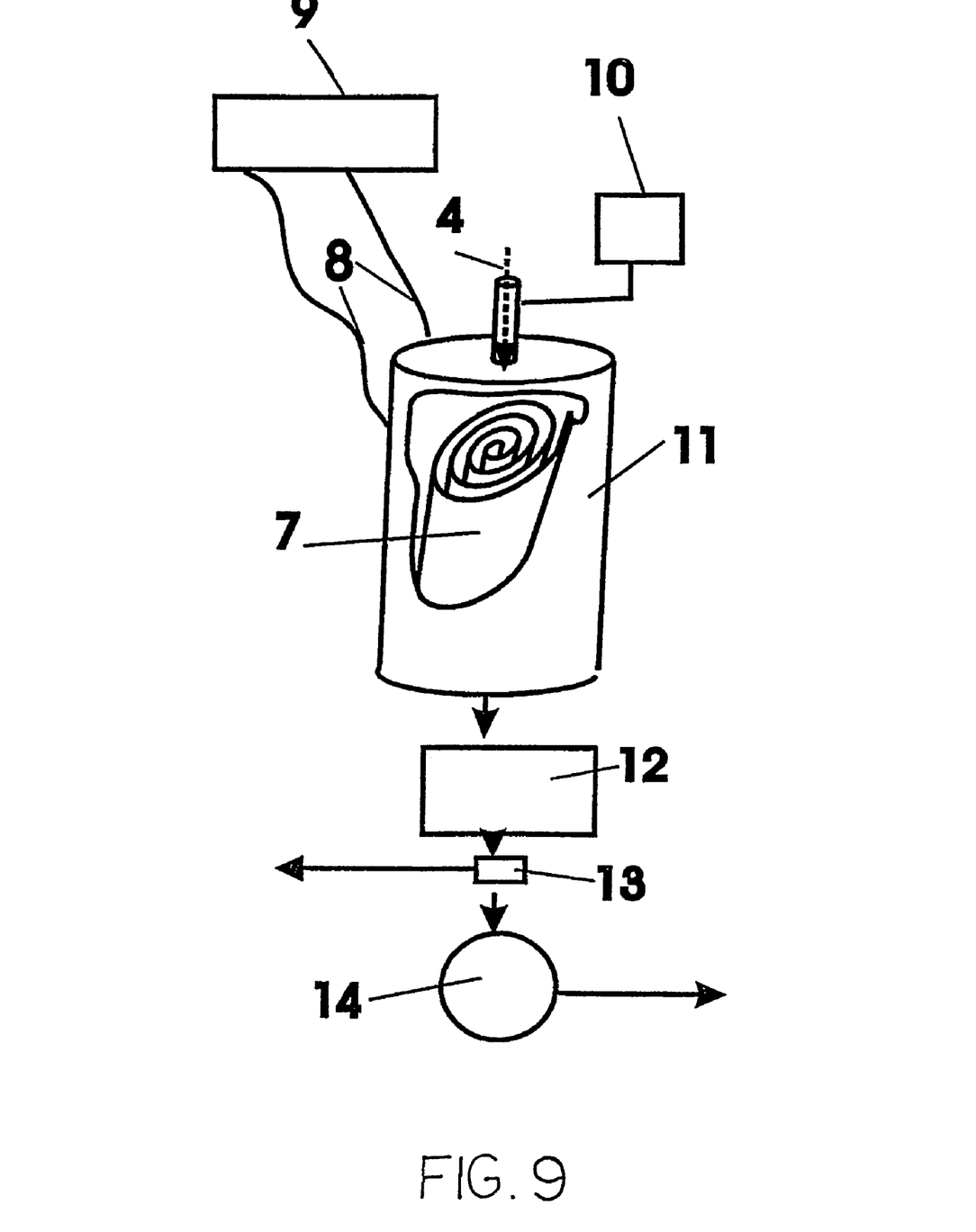
FIG. 9 illustrates an alternative design of a flow-through capacitor or flow-through electrochemical cell utilizing an electrode array in a spiral-wound configuration.

FIG. 9 depicts an alternative design of a flow-through capacitor or flow-through electrochemical cell utilizing the electrode array 7 of the present invention. Electrode array 7 is shown in FIG. 9 in a spiralwound configuration, but may be any geometry of layers with a flow path alongside or through the layers. As shown in FIG. 9, flow path 4 descends downward through electrode array 7, inside cartridge holder 11. A power supply 9 can supply electric power to the anode-cathode pairs of the electrode array 7. Pretreatment item 10 can optionally be included in the electrochemical system of FIG. 9, as determined by one skilled in the art. Without limitation, in one embodiment, pretreatment item 10 can be a source of an anti-foulant chemical, acid, or polyphosphate that is metered into the fluid feed stream when the cell is used as a flow-through capacitor, or alternatively only during the concentration-waste generating cycles of operations. Where used as a fuel cell, a fuel tank or source may be added, and a storage battery or electrical load may be provided. Valve 13 can be controlled by mechanisms known to those skilled in the art, such as a computer, a logical controller, a conductivity sensor, a timer, or a relay. Where the electrode array 7 is used in a flow-through capacitor, valve 13 can be a means of separating the waste product part of a flow-through capacitor cycle.

In additional alternative embodiments, the electrochemical system can further comprise an accumulation tank, and may be, for example, a bladder tank. Cartridge holder 11 may be engineered so that the cartridge or electrode array 7 can be easily removed. An existing cartridge-cartridge holder combination common to the water filtration industry can be adapted for this purpose, as would be understood to those skilled in the art. Any existing means of connecting a removeable battery to a load while inside a device or cartridge may be duplicated as a means of providing power to the cartridge or electrode array 7 inside of the cartridge holder 11.

The electrode arrays of the invention can be prepared with the materials discussed below.

Electrodes

The electrode material may be, without limitation, a fringe field electrode, a carbonaceous material, a conductive polymer, ceramic, metal film, aluminum or tantalum with an oxide layer, metalized polymer or MYLAR®, a binder carbon mixture, a binder carbon powder mixture, a polytetrafluoroethylene (PTFE) carbon powder, PTFE carbon black, or PTFE activated carbon mixture. One preferred embodiment is to use a carbon material having a surface specific capacitance of about 5 microfarads per square centimeter of electrode surface area, where single electrode capacitances are measured in concentrated sulfuric acid or in 0.6 M sodium chloride (NaCl). The electrode surface area above refers to the internal surface area of the electrode material, as measured by the B.E.T. or nitrogen absorption method.

Also useful as an electrode material of the invention are those materials that provide over 1 farad/cubic centimeter capacitance. Carbon is particularly advantageous, due to the fact that carbons may be selected for long life times, for example, over 1000 hours, while cycle charging in 0.6 M NaCl. Forms of carbon that may be used include, without limitation, carbon black activated carbons, aerogels, reticle carbons, nanotubes, high capacitance carbon blacks, alkali- and acid-activated carbons, carbon fibers, and carbons selected for resistance to oxidation.

Where it is desirable use an electrode material that includes a binder, various forms of binder may be used, including latex, polyolefins, PTFE, phenolic resin, and carbonized binders. Binders known to the art and used to bind carbon particles together in capacitors may be employed, including sintered organic binders. A particularly advantageous form of binder is a polyelectrolyte or polymer, either cross-linked or noncross-linked, which forms a hydrogel in water. These include, but are not limited to, polystyrene with ionic groups, including sulfonic acid and amine groups, strong acid groups, strong base groups, as well as weak acid or weak base, or a suitable group known to those skilled in the art to be useful in ion exchange resins. Other binders that may be used include: cross-linked, acrylic acid; methylacrylic acid; acrylamide; acrylonitrile; melamine; urethane; acrylic, heat, or radiation curable polymers; epoxy; water absorbent polymers; and polymers modified with crosslinks, ionic, or hydrophilic groups. Hydrophilic binders are preferred. Binders that occlude less than 50% of the B.E.T. measured surface area of the carbon particles are also preferred. The amount of cross-linking may be varied from between 0.1% and 75% in order to increase ion exchange capacity.

Additional polymers and manufacturing methods of forming a polymer layer may be used as a binder to form the carbon or other conductive material together into electrodes for use in the present invention. See, Gray, Fiona M., *Solid Polymer Electrolytes*, VCH Publ., 1991. Amounts of cross-linking may vary from 0% to 50% or more. Suitable carbon particle electrode binding polymers include: polyethers, polyamides, polyacrylic acid, polyamines, polyvinyl alcohol, polyvinylcaprolactam, and vinylpyrrolidone polymers, as well as any homopolymers, copolymers, block, dendritic, cage, or star polymers, comb branched, network, random, or other polymer mixtures of the above.

U.S. Pat. No. 6,183,914 B1, issued Feb. 6, 2001, discloses a polymerbased conducting membrane. This material, as well as the prior art materials cited in this patent, may be mixed with carbon particles to be used as a binder formulation used to manufacture electrodes according to the present invention. Polyelectrolytes may be used together or combined with electrodes as described in PCT International Application No. US01/12641, entitled "Charge Barrier Flow-Through Capacitor"(WO 02/086195). These polyelectrolytes may, for example, be cross-linked or intertwined together so that the electrode does not swell more than 50% in water. The percent of cross-linking needed to achieve this may be 2% or more. Polyelectrolytes may be held together inside a different network polymer, particularly by selecting polymers or polyelectrolytes with molecular weights above 1000. Block or copolymers may also be used. Polyelectrolytes may be derivatized, either before or prior to incorporation into the electrode, using any ionic group, chemistry, or manufacturing method known to be used in ion exchange resins or permselective membranes.

For use in integrated charge barriers, the hydrogel may have ionic or ion exchange groups bound to it, as known to those skilled in the art. Without limitation, ionic groups described in the charge barrier flow-through capacitor of PCT International Application No. US01/12641 (WO 02/096195) may be used. These ionic groups may be fixed to a binder material or may be fixed to a coating, membrane, polymer, or polyelectrolyte either as a layer on top of the electrolyte, infiltrated throughout the electrode, used to bind electrode material together, or fixed directly to the carbon or other electrode material itself. The amount of cross-linking may be varied so that the ion exchange capacity of the hydrogel polyelectrolyte binder may be above 0.1 milliequivalents per cubic centimeter, for example, above milliequivalents per cubic centimeter, up to 4-7 or more milliequivalents per cubic centimeter. High ion exchange capacity of over 0.1 cubic centimeter is advantageous to exclude ions from the pores of the electrode due to Donnan Exclusion. Ionic groups may be selected from strong acid, strong base, weak acid, weak base, chelating, ion selective, or biologically selective groups, including the use of antibodies and enzymes fixed to the hydrogel binder.

In other embodiments, electrodes can be prepared from a carbon material or carbon binder mixture currently used in electrochemical cells, as known to those skilled in the art. In addition to the already cited examples, this can include, without limitation to: polymer-grafted carbon preparations, such as those described in http://ecl.web.psi.ch/Publications/Richner A00.pdf, and reticulated carbon, aerogel carbon, carbon fibers, nanotube carbons, activated carbons, carbon-hydrogel mixtures, suspensions of carbon binder mixtures formulated for use in coating processes, graphite, or any kind of carbon, in addition to other metallic, ceramic, polymeric, organic, or inorganic conductive materials. Optionally, any of these above materials may be mixed with a binder, sintered, or combined together in other combinations.

Some electrochemical cells may beneficially require that alternate electrodes be of different materials. For example, electrode arrays for use in lithium ion batteries can be of alternating groups of intercalating graphite electrodes and oxide electrodes such as, without limitation, oxides of nickel, manganese, cobalt, or mixtures thereof. Solid polymer electrolytes, or other various electrolytes used in a given electrochemical cell technology, can be used together with the electrode array of the present invention.

Generally, electrochemical cell technology may be directly adapted to the present invention by using their anode and cathode materials into the anodes and cathode materials of the electrode array and using their electrolyte within or between electrode arrays, such as separated by a fluid-containing space or spacer to contain the electrolyte. For general use in energy storage devices, such as lithium ion or electrochemical batteries, the electrodes of the present invention may be separated by a spacer whose purpose is not for flow, but to contain electrolyte. Flow spacers within the cell, together with a cartridge holder containing inlet and outlet means, may be added for fuel cells, flow-through capacitors, and other flow-through electrochemical cells. In either case, the electrolytes, electrode materials, and spacer materials used in any prior art electrochemical cell may be used as electrolytes, electrodes, and fluid-containing spacers with the electrode array of the present invention.

Dielectric Spacer

The dielectric spacer used as an insulating material between the electrodes may be a sheet of material of less than, for example, 0.1 inches, preferably under 0.02 inches, for example, 0.0001-0.020 inch. The sheet may be of MYLAR®, polymer, plastic, or a nonporous or porous sheet material known to those skilled in the art. In some embodiments, the spacer may be prepared from a material that is an electric and ionic insulator, that is electrically insulating but an ionic conductor, is a membrane, e.g., a NAFION® membrane (NAFION is a registered trademark of E.I. Du Pont De Nemours and Company Corporation of Wilmington, Del.), a membrane of selective permeability, or a nonwoven, woven, ceramic, or other thin sheet material.

Current Collector

An optional current collector-layer may be used comprised of metal, titanium, or graphite foil or graphite coatings on a nonconductive film, or of a metal foil or film, a metallized polymer film, or of a conductive layer, such as a layer of conductive polymer or ceramic substrate. Foils or films under 0.1 cm thick are preferred, for example, 0.02 cm or less thick. The current collector may either be coated on or embedded within the electrode, or, may serve as a flat substrate for electrode or spacer layers.

Optional Flow Channel

Materials useful for forming a channel for the flow of fluids in a flow-through capacitor include those materials known to the art to be suitable as flow spacer in prior art flow-through electrochemical cells, including without limitation: netting, biplanar filtration netting, thermoplastic material, insect netting, nonwoven textile spacers, protrusions or bumps, and screen-printed pairs of offset lines. Flow channels can be of a thickness chosen by one skilled in the art. Given that capacitance is formed within the electrode layer, flow channels may be as thick or as thin as desired to optimize flow properties and to optimize pressure, for example, to reduce any potential drop in pressure. Without limitation, pressures can be optimized at below 100 psi, for example, 10 psi or less.

Any of the above layers may be laminated, glued, or formed together into an integral composite material.

Numerous embodiments besides those mentioned herein will be readily apparent to those skilled in the art and fall within the range and scope of the invention. All references cited in this specification are incorporated by reference in their entirety. The following examples illustrate the invention, but are in no way intended to limit the invention.

EXAMPLE 1

A thin sheet electrode array, under 0.1 inches thick, preferably under 0.02 inches thick, with alternating electrodes such as shown in FIG. 1 or 2, is placed against a flow spacer. One or more electrode array layers are placed together with the flow spacer in any geometry used in flow-through capacitors or electrochemical cells. The electrode array and flow channel layers may be held together or compressed between end plates in order to form a flow-through electrochemical cell. Inlet and outlet means are provided exactly as in any other parallel electrode prior art electrochemical cell. The difference in the present invention is that electrodes in any prior art electrochemical cell geometry are replaced by electrode arrays of the present invention. A separate layer of current collectors may be placed underneath the electrode material.

EXAMPLE 2

Carbon powder PTFE electrodes of 0.01 inch thick are laminated with a graphite current collector layer and a 0.001-inch thick, nonporous, polymer spacer on one or both sides of the electrode/current collector. Arrays of holes 0.005 inches wide, spaced 0.010-inch center to center, are cut through spacer, electrode, and current collector layers in order to form a thin sheet electrode array. This array may be spiral wound, stacked flat against, or laminated for use with a separator used to form a flow channel and formed into an electrochemical cell or flow-through capacitor of any prior art geometry, where the electrode array of the present invention replaces the electrode used in the prior art.

EXAMPLE 3

Carbon powder PTFE electrodes of 0.01 inch thick are laminated with a graphite current collector layer and a 0.001-inch thick, nonporous, polymer spacer on one or both sides of the electrode/current collector. This is subsequently stacked or rolled into a jelly roll and heat treated or glued together in order to bind the layers together into a monolith. The monolith may be a rectangle, or cylinder, or any other shape. The monolith is subsequently skived diagonally or perpendicularly across the layers in order to form thin electrode sheet arrays of the present invention for use in electrochemical cells or flow-through capacitors.

EXAMPLE 4

Arrays of conductive lines 0.003 inches thick, 0.0005 inches tall, and spaced apart 0.001 inches, are printed onto polymer or MYLAR® film in order to form an electrode array of the present invention.

EXAMPLE 5

A carbon black binder mixture is screen-printed onto an insulating spacer to form an array of lines 0.003 inches wide, 0.0005 inches tall, and spaced apart 0.001 inches. The spacer may be a polymer, porous, or nonporous, for example, MYLAR®, or a nonwoven porous polyolefin sheet material, or a thin film of any polymer. Every other line extends out further than the next line. These lines may be connected in parallel by placing a conductive strip down a side, back, and/or length of the alternating anodes on one side and the cathodes on the other side. Alternating the power supply means used to apply voltage to the electrode lines may reverse polarity.

To form a current collector, a graphite or other conductive layer may be printed or coated directly on top of the lines, in order to form a conductive layer.

EXAMPLE 6

Layers of electrode, insulating spacer, and optional current collector are rolled into a jelly roll or into concentric circles. By use of binders, heat, calendars, coating, spraying or other means, these layers are formed into a composite that is subsequently skived or sliced into 0.020 inch or less sheets, by cutting diagonally or perpendicularly across the layers. This forms electrode array sheets. These electrode array sheets may be further layered or laminated with a flow spacer in order to form a flow-through capacitor. The laminated electrode arrays may be put together with additional spacers, porous spacers, ion conductive spacers, membrane spacers, nonwoven or woven or net spacers, screen-printed, open, or any other spacer means used in facing geometries as in any other prior art flow-through capacitor or electrochemical cell.

Flow may be through or preferably across the electrode array and through the flow space between the facing electrode arrays.

EXAMPLE 7

A laminate of alternating electrodes and spacers is formed by coating, spraying, electroplating, extrusion, or calendaring methods to form a log, rectangle, or cylinder which is subsequently cut into layers less than 0.5 inches thick, or which is extruded into thin sheets with the parallel laminations running across the width or the length of the sheet. Sheets may be less than 0.5 inches thick, for example, less than 0.02 inches thick. Electrodes in this sheet may be thinly divided by insulating spacer lines, less than 0.02 inches apart. Alternating electrodes or current collectors may be masked or insulated at the ends, so that a perpendicular connecting lead may connect alternate electrodes on each end to form anode/cathode pairs, as illustrated in FIG. 1.

EXAMPLE 8

A thin conductive film of graphite or polymer-backed graphite is painted with a photo resist masking chemical and illuminated through a pattern to expose a series of lines 0.05 cm or less wide and 0.05 cm or less apart. Upon washing, a pattern of grooves is revealed exposing the underlying current collector material. A carbon black material of over 500 BET is mixed with a 5% or more cross-linked, strong polyelectrolyte or hydrogel binder containing strong acid or strong base groups, or, alternatively, is mixed with any other binder to form a slurry. This slurry is wiped, sprayed, or coated onto the current collector/photo resist layer. Any excess is wiped off, revealing an alternating pattern of electrode and insulating material lines. This carbon binder mixture may be cross-linked, dried, or solidified by temperature, or by light, catalysts, time, or other methods. Two of these identical sheets may be sandwiched together with a flow spacer and manufactured to form a flow-through capacitor according to any prior art flow through capacitor geometry, such as those described in Andelinan U.S. Pat. Nos. 5,192,432, issued Mar. 9, 1993; 5,196,115, issued Mar. 23, 1993; 5,200,068, issued Apr. 6, 1993; 5,360,540, Nov. 1, 1994; 5,415,768, issued May 16, 1995; 5,547,581, issued Aug. 20, 1996; 5,620,597, issued Apr. 15, 1997; 5,748,437, issued May 5, 1998; 5,779,891, issued Jul. 14, 1998; or in Otowa U.S. Pat. No. 5,538,611, issued Jul. 23, 1996; or in Andelman PCT International Application No. US01/12641, "Charge Barrier Flow-Through Capacitor"(WO 02/086195). Alternatively, all layers may be screen-printed. Electrode or spacer layers may be made as protruding ridges in order to form flow channels when two electrode arrays are placed together in an opposing manner, with the sets of lines offset at an angle from each other.

EXAMPLE 9

The electrode array of the present invention may require the manufacture of patterned thin films of materials in juxtaposition to each other, layered together, or on top of each other. A particularly useful method to do this is to use electrostatic or other self assembly methods, such as those described in U.S. Pat. Nos. 6,316,084, issued Nov. 13, 2001, and U.S. Pat. No. 6,291,266, issued Sep. 18, 2001, and Spillman Jr., et al. U.S. Patent Application Publication No. 20020037383A1, published Mar. 28, 2002, each of which is hereby incorporated by reference. These methods can be used to manufacture the electrodes, spacers, and current collectors of the present invention. Electrostatic powder coating technology can also be used to form the electrode, current collector, insulating spacer, and flow spacer layers. Especially where electrodes are dots or shapes other than lines, and need to be connected in groups of anodes and cathodes, technology such as described in U.S. Pat. No. 5,070,036, issued Dec. 3, 1991, and U.S. Pat. No. 4,977,440, issued Dec. 11, 1990, can be used to form interconnecting groups of current collectors.

What is claimed is:

1. An electrode array for use in an electrochemical cell, said array comprising:
    at least one pair of oppositely-charged electrodes comprising:
    a) an anode having a first anode face and a second anode face, said first anode face being broader than said second anode face; and
    b) a cathode having a first cathode face and a second cathode face, said first cathode face being broader than said second cathode face, wherein said first anode face is not directly opposed to said first cathode face in said array; and
    c) a dielectric material between said second anode face and said second cathode face.

2. A sheet material containing the electrode array of claim 1.

3. An electrochemical cell consisting of the sheet material of claim 2.

4. The sheet material of claim 3, wherein said sheet material is wound in a spiral.

5. The electrode array of claim 1, wherein said electrode array further comprises a planar substrate, and said electrodes are coplanar on said substrate.

6. The electrode array of claim 2, where said electrodes of said pair of electrodes are made from a carbon material.

7. The electrode array of claim 1, wherein said electrode array has a series resistance of less than 50 ohms/cm$^2$ of electrode array facing area, and an electrical leakage resistance of more than 30 ohms/cm$^2$ of electrode array facing area.

8. The electrode array of claim 1, wherein the first anode face is separated from the first cathode face by a distance of less than 3 millimeters.

9. The electrode array of claim 1, wherein the second anode face is separated from the second cathode face by a distance of more than 0.002 centimeters.

10. The electrode array of claim 1, wherein each of said electrodes in said electrode pair has a concentric spiral shape.

11. The electrode array of claim 1, wherein each of said electrodes has a surface area of greater than 10 m$^2$/gram B.E.T.

12. A flow-through capacitor comprising the electrode array of claim 1.

13. The flow-through capacitor of claim 12, further comprising a fluid flow path for the passage of a fluid across the surface of said array.

14. A flow-through capacitor comprising the electrode array of claim 5 and a flow path for the passage of a fluid across the first anode face and across the first cathode face in said array.

15. The flow-through capacitor of claim 14, wherein said flow path comprises a porous, nonelectrically-insulating material.

16. A flow-through capacitor comprising:
a) at least two electrode arrays of claim 5; and
b) a flow path for the passage of a fluid across the first anode face and the first cathode face of the electrodes in said array, said flow path having a thickness of at least 20 micrometers in thickness.

17. A method of lowering the series resistance of an electrochemical cell, comprising the steps of:
a) providing an electrode array, said array comprising a planar substrate and at least one pair of electrodes on said planar substrate comprising an anode and a cathode, wherein said anode has a first anode face and a second anode surface, said first anode face being broader than said second anode face, and wherein said cathode has a first cathode face and a second cathode face said first cathode face being broader than said second cathode face and wherein said first anode face is not directly opposed to said first cathode face; and
b) inserting said electrode array into said electrochemical cell.

18. The method of claim 17, wherein said electrochemical cell is a flow-through capacitor.

19. The method of claim 17, wherein said electrochemical cell is a lithium battery.

* * * * *

UNITED STATES PATENT AND TRADEMARK OFFICE
CERTIFICATE OF CORRECTION

| | | |
|---|---|---|
| PATENT NO. | : 7,368,191 B2 | |
| APPLICATION NO. | : 10/484981 | |
| DATED | : May 6, 2008 | |
| INVENTOR(S) | : Marc D. Andelman and Jon Zulkiewicz | |

It is certified that error appears in the above-identified patent and that said Letters Patent is hereby corrected as shown below:

Column 5, line 35, delete "ira" and insert --in--

Column 10, line 19, delete "polymerbased" and insert --polymer-based--

Column 10, line 43, delete "02/09615" and insert --02/08615--

Column 14, line 12, delete "Andelinan" and insert --Andelman--

Signed and Sealed this

Twelfth Day of August, 2008

JON W. DUDAS
*Director of the United States Patent and Trademark Office*